United States Patent
Chang et al.

(10) Patent No.: US 9,632,822 B2
(45) Date of Patent: Apr. 25, 2017

(54) MULTI-CORE DEVICE AND MULTI-THREAD SCHEDULING METHOD THEREOF

(71) Applicant: HTC Corporation, Taoyuan, Taoyuan County (TW)

(72) Inventors: Wen-Yen Chang, Taoyuan (TW); Chih-Tsung Wu, Taoyuan (TW); Ching-Tsung Lai, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 893 days.

(21) Appl. No.: 13/961,604

(22) Filed: Aug. 7, 2013

(65) Prior Publication Data
US 2014/0089936 A1 Mar. 27, 2014

Related U.S. Application Data

(60) Provisional application No. 61/704,253, filed on Sep. 21, 2012.

(51) Int. Cl.
*G06F 9/46* (2006.01)
*G06F 9/48* (2006.01)
*G06F 9/50* (2006.01)

(52) U.S. Cl.
CPC .......... *G06F 9/4843* (2013.01); *G06F 9/4881* (2013.01); *G06F 9/50* (2013.01); *G06F 9/505* (2013.01); *G06F 2209/483* (2013.01); *G06F 2209/501* (2013.01)

(58) Field of Classification Search
None
See application file for complete search history.

(56) References Cited

U.S. PATENT DOCUMENTS

| 5,872,972 | A | * | 2/1999 | Boland | G06F 9/5033 718/102 |
| 8,327,187 | B1 | * | 12/2012 | Metcalf | G06F 15/16 714/10 |
| 2006/0123423 | A1 | | 6/2006 | Brenner | |
| 2011/0161972 | A1 | * | 6/2011 | Dillenberger | G06F 9/5044 718/104 |
| 2012/0284729 | A1 | * | 11/2012 | Sharda | G06F 9/5094 718/104 |

FOREIGN PATENT DOCUMENTS

| CN | 1601475 A | 3/2005 |
| CN | 102184125 A | 9/2011 |
| CN | 102609312 A | 7/2012 |
| TW | 200643736 A | 12/2006 |
| TW | 200945206 A | 11/2009 |

* cited by examiner

*Primary Examiner* — Lewis A Bullock, Jr.
*Assistant Examiner* — Mark Gooray
(74) *Attorney, Agent, or Firm* — Birch, Stewart, Kolasch & Birch, LLP

(57) ABSTRACT

A multi-core device and a multi-thread scheduling method thereof are disclosed. The multi-thread scheduling method includes the following steps: recording thread performance-associated parameters for a thread; and performing a thread load balancing between multiple central processing units of a multi-core processor of the multi-core device. The thread load balancing is performed according to a thread critical performance condition of the thread and the thread critical performance condition is determined based on the thread performance-associated parameters.

16 Claims, 8 Drawing Sheets

MULTI-CORE DEVICE AND MULTI-THREAD SCHEDULING METHOD THEREOF

CROSS REFERENCE TO RELATED APPLICATIONS

This application claims the benefit of U.S. Provisional Application No. 61/704,253, filed Sep. 21, 2012, the entirety of which is incorporated by reference herein.

BACKGROUND OF THE INVENTION

Field of the Invention

The present invention relates to multi-core devices, and in particular, relates to multi-thread management in a multi-core device.

Description of the Related Art

A scheduler, an arbiter on a modern Operating System (OS), decides the execution order of all runnable threads (or tasks). Conventionally, the scheduling rule of an OS is based upon priority. A thread with a higher priority cannot be preempted by a thread with a lower priority, and, the thread with a higher priority will be given a longer time slice to run in comparison with the lower priority threads.

As to an OS running on a multi-core device, the scheduler is capable of balancing all runnable threads onto the different central processing units periodically, which is called thread load balancing. Conventionally, the policy of thread load balancing is to balance the thread amounts between the different central processing units while the priorities of the threads have been taken into consideration. However, for thread load balancing based on the amount or the priority of threads, it cannot reflect actual loading of each thread (task) since different threads demand different central processing unit resources and it is not guaranteed that each thread is allocated to a proper central processing unit between the multiple central processing units. Also, for being critical problem, waiting until a next conventional thread load balancing timeframe arrives may be too late to resolve critical thread loading (also called thread critical performance condition in this invention). If occurring on a mobile device, the problem increases exponentially because a mobile device allows idle CPUs to be turned off in order to prolong battery life and only a decreased number of CPUs are available to share the workload.

BRIEF SUMMARY OF THE INVENTION

A multi-core device and a multi-thread scheduling method are disclosed.

A multi-core device in accordance with an exemplary embodiment of the invention comprises: a multi-core processor, a random access memory and a code storage. The multi-core processor comprises multiple central processing units. The random access memory is coupled to the multi-core processor. The multi-core processor uses the random access memory to store thread performance-associated parameters for a thread. The code storage is stored with operating system codes to be executed by the multi-core processor to provide an operating system scheduler to perform a thread load balancing between the multiple central processing units. The thread load balancing is performed according to a thread critical performance condition of the thread and the thread critical performance condition is determined based on the thread performance-associated parameters.

In another exemplary embodiment, a multi-thread scheduling method for a multi-core device is disclosed, which comprises the following steps: recording thread performance-associated parameters for a thread; and performing a thread load balancing between multiple central processing units of a multi-core processor of the multi-core device. The thread load balancing is performed according to a thread critical performance condition of the thread and the thread critical performance condition is determined based on the thread performance-associated parameters.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments which carry out the invention. This description is made for the purpose of illustrating the general principles of the invention and should not be taken in a limiting sense. The scope of the invention is best determined by reference to the appended claims.

Figure 1:
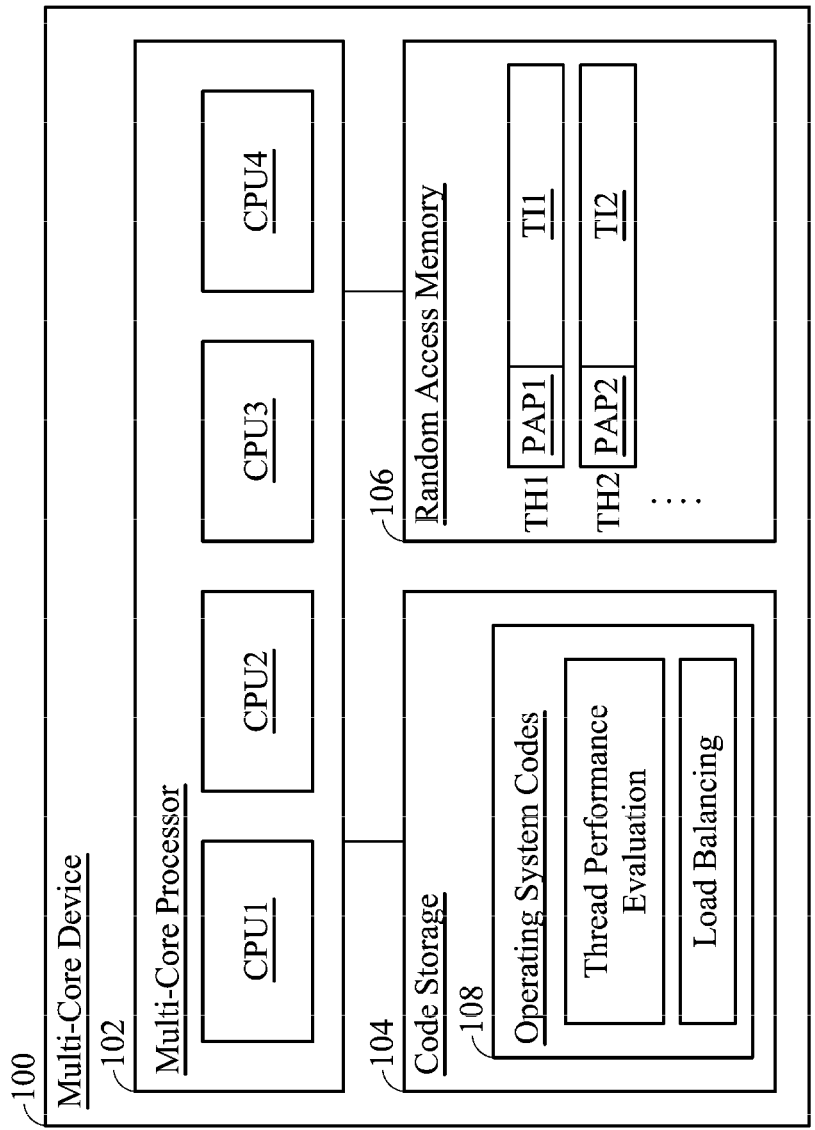
FIG. 1 is a block diagram of a multi-core device 100 in accordance with an exemplary embodiment of the invention.

FIG. 1 is a block diagram of a multi-core device 100 in accordance with an exemplary embodiment of the invention. The multi-core device 100 comprises a multi-core processor 102, a code storage 104 and a random access memory 106. The multi-core processor 102 comprises multiple central processing units CPU1, CPU2, CPU3 and CPU4. The code storage 104 is stored with operating system codes 108 to be executed by the multi-core processor 102 to provide an operating system scheduler for thread (or task) management. Thread performance evaluation and thread load balancing between the different central processing units CPU1 to CPU4 are performed via the operating system scheduler. The random access memory 106 is coupled to the multi-core processor 102. By execution of the operating system scheduler, the multi-core processor 102 evaluates thread performance for each thread and dispatches the threads to the multiple central processing units CPU1, CPU2, CPU3 and CPU4 based on the evaluated thread performances. The multi-core processor 102 uses the random access memory 106 to store performance-associated parameters (PAP1, PAP2 . . . ) of the threads, for the thread performance evaluation and the thread load balancing between the multiple central processing units CPU1 to CPU4.

In the exemplary embodiment shown in FIG. 1, for each thread, the performance-associated parameters are temporarily stored in the random access memory 106 with (or within) the conventional thread information (e.g., the thread context and so on.) As shown, the performance-associated parameters PAP1 of the thread TH1 are stored in the random access memory 106 with the conventional thread information TI1 of the thread TH1, and the performance-associated parameters PAP2 of the thread TH2 is stored in the random access memory 106 with the conventional thread information TI2 of the thread TH2, and so forth.

Figure 2:
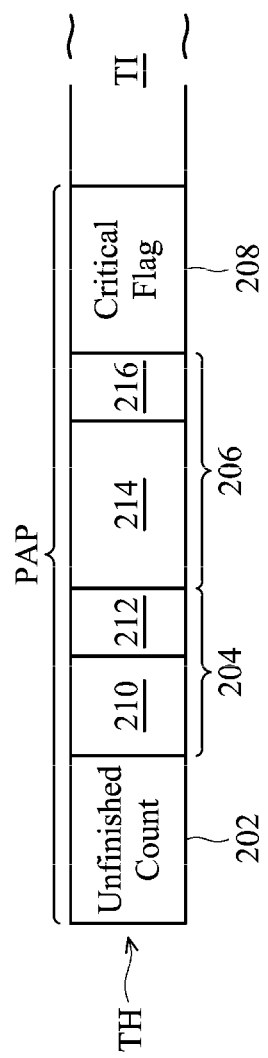
FIG. 2 depicts a data format of the performance-associated parameters PAP in accordance with an exemplary embodiment of the invention.

FIG. 2 depicts a data format of the performance-associated parameters PAP in accordance with an exemplary embodiment of the invention. For a thread TH, the performance-associated parameters PAP stored in a random access memory with the conventional thread information TI may include an unfinished count 202, waiting latency information 204, the MIPS/clock cycle value information 206 and a critical flag 208. Both the historic waiting latency information 210 and the currently evaluated waiting latency 212 are recorded as the waiting latency information 204. Both the historic MIPS/clock cycle value information 214 and the currently evaluated MIPS/clock cycle value 216 are recorded as the MIPS/clock cycle value information 206. In the following paragraphs, it is discussed how the performance-associated parameters PAP are used to implement thread performance evaluation and thread load balancing.

Figure 3:
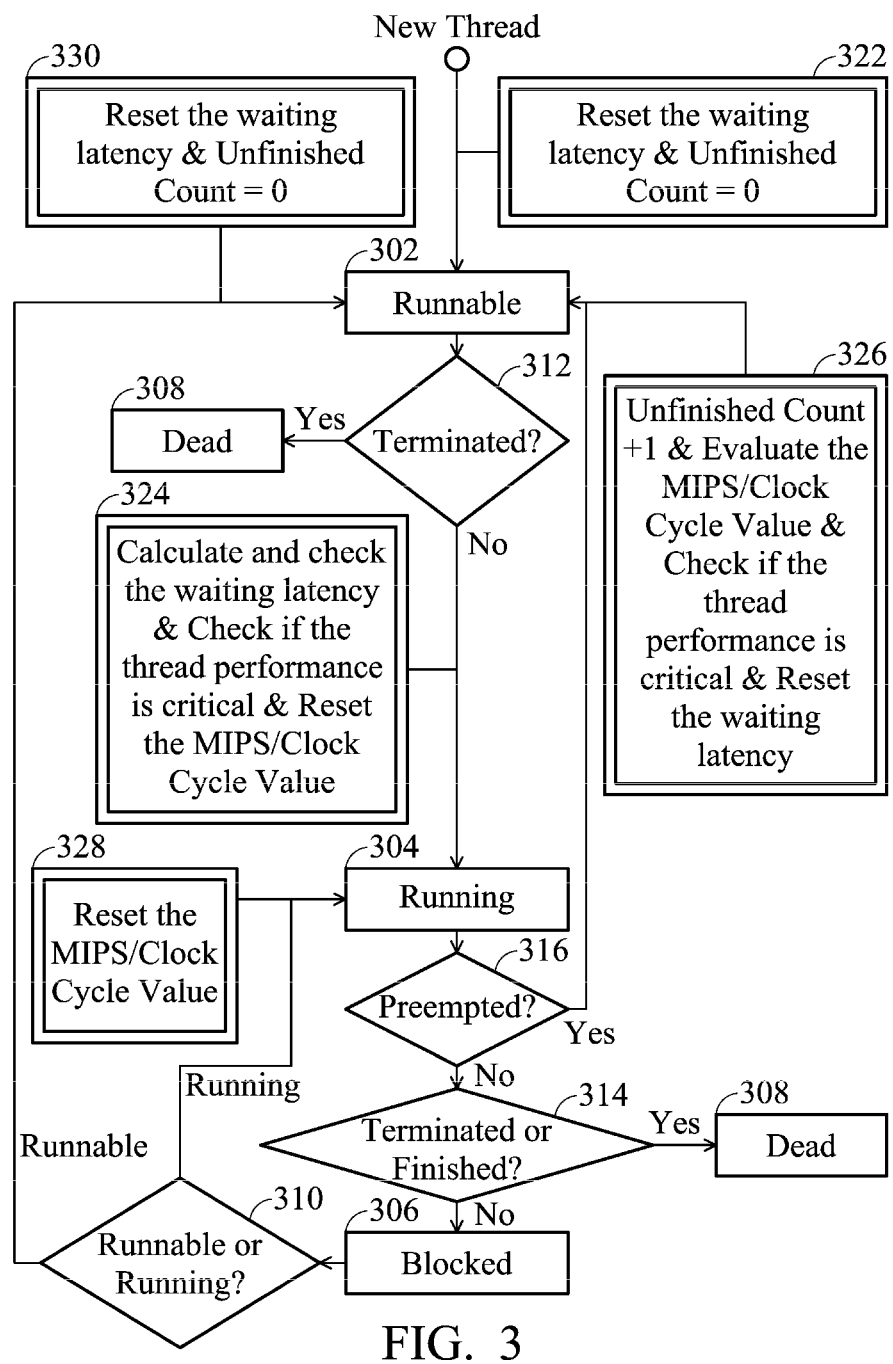
FIG. 3 depicts a state machine of a thread in accordance with an exemplary embodiment of the invention.

FIG. 3 depicts a state machine of a thread in accordance with an exemplary embodiment of the invention. According to an operating system scheduler, a thread is switched between a runnable state 302, a running state 304, a blocked state 306 and a dead state 308. In the runnable state 302, the thread is waiting in a runnable queue to compete for processor resources. When the thread gains the processor resources, the thread is switched to the running state 304 and is executed. When the running thread is waiting for an event (e.g. I/O interrupt event), the thread is switched to the blocked state 306. When the event associating to the thread occurs but the processor resources have been occupied by another thread of a higher priority (refer to the determination block 310, it is determined that the released thread is just runnable and cannot run immediately), the released thread is switched to the runnable state 302 and pushed into the runnable queue, otherwise, the released thread is switched back to the running state 304 and is continued. When the thread is terminated or is finished (refer to the determination blocks 312, 314), the thread is switched to the dead state 308. Further, a running thread may lose processor resources when facing a higher priority thread and thereby preempted (refer to the determination block 316). The preempted thread should leave the running state 304 and be pushed into the runnable queue again in the runnable state 302. Blocks 322~330 show how the performance-associated parameters PAP vary between the different thread states, and, critical performance recognitions are performed in blocks 324 and 326.

As shown in block 322, when a new thread is generated, a waiting latency and an unfinished count corresponding thereto are both reset. The waiting latency is operative to show how long the thread waits in the runnable state 302 before switching to the running state 304. Refer to block 324, when the thread switches to the running state 304, the waiting latency counted in the runnable state 302 is calculated and checked and thereby it is recognized whether the thread performance is critical. A thread performance is critical means that the thread needs more processor resources to complete its' task. A long waiting latency period may represent poor thread performance. When the thread performance is recognized as being critical, the critical flag 208 of FIG. 2 is asserted (e.g., showing a thread critical performance condition is critical).

Further, as shown in block 324, a MIPS/clock cycle value of the thread is reset when the thread is switched to the running state 304. "MIPS" is the abbreviation for "Million Instructions Per Second," which reflects the execution speed of a thread in running state 304 and may be also presented by a clock cycle value (e.g., calculated by multiplying the CPU frequency by an output of a timer.) Refer to block 326, every time the thread is preempted, the 1 is added to the unfinished count, and, the MIPS/clock cycle value for the thread during the running state 304 is evaluated and thereby it is recognized whether the thread performance is critical. A small MIPS/clock cycle value may represent poor thread performance. When the thread performance is recognized as being critical, the critical flag 208 of FIG. 2 is asserted.

Note that the waiting latency of the thread may be further reset as shown in block 326 or as shown in block 330 when the thread is switched to the runnable state 302 again. The MIPS/clock cycle value may be further reset as shown in block 328 when the thread released from the blocked state 306 is switched to the running state 304. Further, when a thread released from the blocked state 306 is pushed into the runnable queue again (switched to the runnable state 302), the unfinished count is refreshed to zero as shown in block 330. The unfinished count may be timely recorded in the random access memory 106 in the field 202 of FIG. 2. The currently-evaluated waiting latency (obtained in block 324), which is the latest calculated waiting latency, may be timely recorded in the random access memory 106 in the field 212 of FIG. 2. The currently-evaluated MIPS/clock cycle value, which is the latest calculated MIPS/clock cycle value, may be timely recorded in the random access memory 106 in the field 216 of FIG. 2. Further, historic information about the waiting latency and the MIPS/clock cycle value may be collected in the random access memory 106 in the fields 210 and 214 of FIG. 2, respectively, which are updated according to the update of the currently-evaluated waiting latency 212 and MIPS/clock cycle value 216. The unfinished count is provided to determine a proportion between the historic waiting latency information 210 and the currently-evaluated waiting latency 212 when recognizing the thread performance in block 324. The unfinished count is also provided to determine a proportion between the historic MIPS/clock cycle value information 214 and the currently-evaluated MIPS/clock cycle value 216 when recognizing the thread performance in block 326. A high unfinished count means that the historic information 210 or 214 is more meaningful.

Figure 4A:
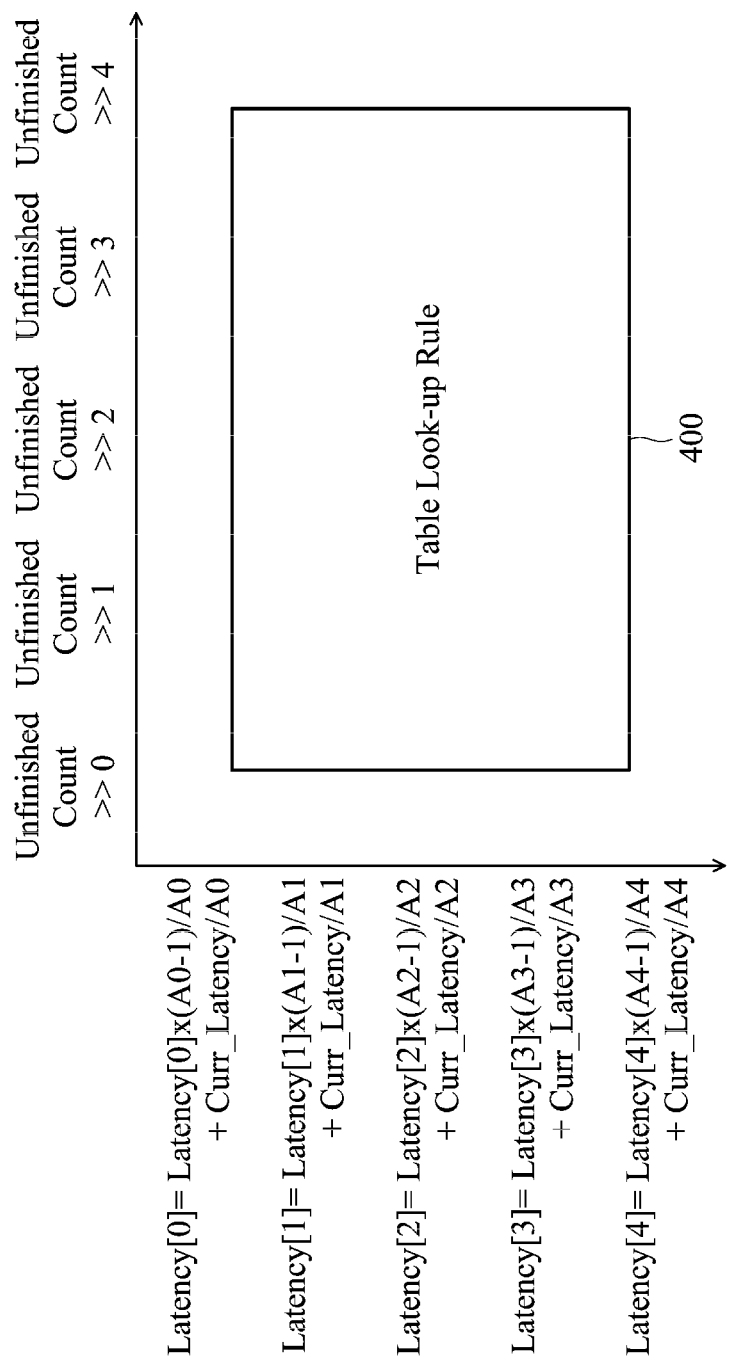
FIGS. 4A and 4B depict an algorithm for thread performance recognition (performed in block 324) based on the historic waiting latency information (210 of FIG. 2) and the currently-evaluated waiting latency (212 of FIG. 2)
Figure 4B:
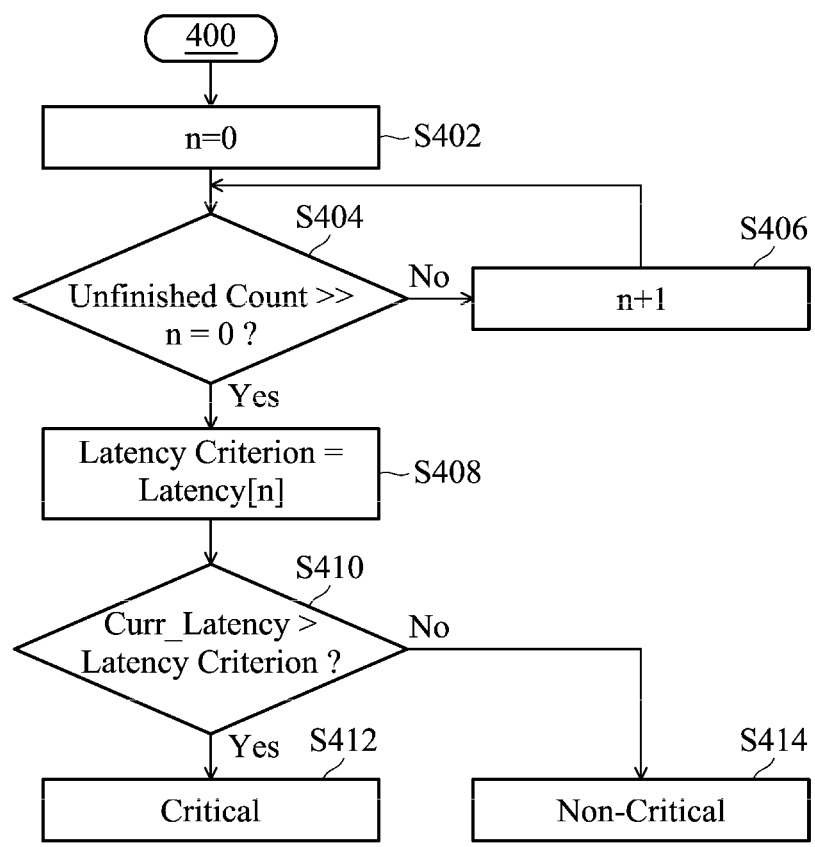

FIGS. 4A and 4B depict an algorithm for thread performance recognition (performed in block 324) based on the historic waiting latency information (210 of FIG. 2) and the currently-evaluated waiting latency (212 of FIG. 2). As shown in FIG. 4A, five values Latency[0], Latency[1], Latency[2], Latency[3] and Latency[4] are monitored and recorded as the historic waiting latency information 210, where:

$$\text{Latency}[0] = \text{Latency}[0] \times (A0-1)/A0 + \text{Curr\_Latency}/A0;$$

$$\text{Latency}[1] = \text{Latency}[1] \times (A1-1)/A1 + \text{Curr\_Latency}/A1;$$

$$\text{Latency}[2]=\text{Latency}[2]\times(A2-1)/A2+\text{Curr\_Latency}/A2;$$

$$\text{Latency}[3]=\text{Latency}[3]\times(A3-1)/A3+\text{Curr\_Latency}/A3; \text{ and}$$

$$\text{Latency}[4]=\text{Latency}[4]\times(A4-1)/A4+\text{Curr\_Latency}/A4.$$

Curr_Latency is the currently-evaluated waiting latency calculated in block 324 and recorded in the field 212. As for the coefficients A0~A4, A0<A1<A2<A3<A4, e.g., A0=1, A1=2, A2=4, A3=8 and A4=16. Thus, as the index values increase, the historic waiting latencies are more meaningful. The disclosed algorithm is performed in accordance with a table look-up rule 400, which is depicted in the flowchart of FIG. 4B.

Refer to the table look-up rule 400 depicted in FIG. 4B, the logical right shift (>>) amount n for an Unfinished Count is initialized to zero in step S402. In step S404, it is determined whether the Unfinished Count>>n is zero. When the Unfinished Count>>n is not zero yet, 1 is added to n in step S406. Once the Unfinished Count>>n equals zero, step S408 is performed and a Latency Criterion is set to be Latency[n]. In step S410, it is determined whether the currently-evaluated waiting latency Curr_Latency is longer than the Latency Criterion (Latency[n]). When the currently-evaluated waiting latency Curr_Latency is longer than the Latency Criterion (Latency[n]), step S412 is performed and the thread performance is determined to be critical and the critical flag 208 of FIG. 2 is asserted, accordingly. Otherwise, step S414 is performed and the thread performance is determined to be non-critical and the critical flag 208 of FIG. 2 is de-asserted (e.g., showing a thread critical performance condition is non-critical).

For example, when the Unfinished Count is 4, with a right shifting operation, the first zero is obtained when right shifting the value 4 by 3 bits (4>>3=0). Thus, the Latency[3] is picked out to be compared with the Curr_Latency. When the Curr_Latency is greater than the Latency[3], it is determined that the performance of the thread is critical. Otherwise, it is determined that the performance of the thread is non-critical.

Figure 5A:
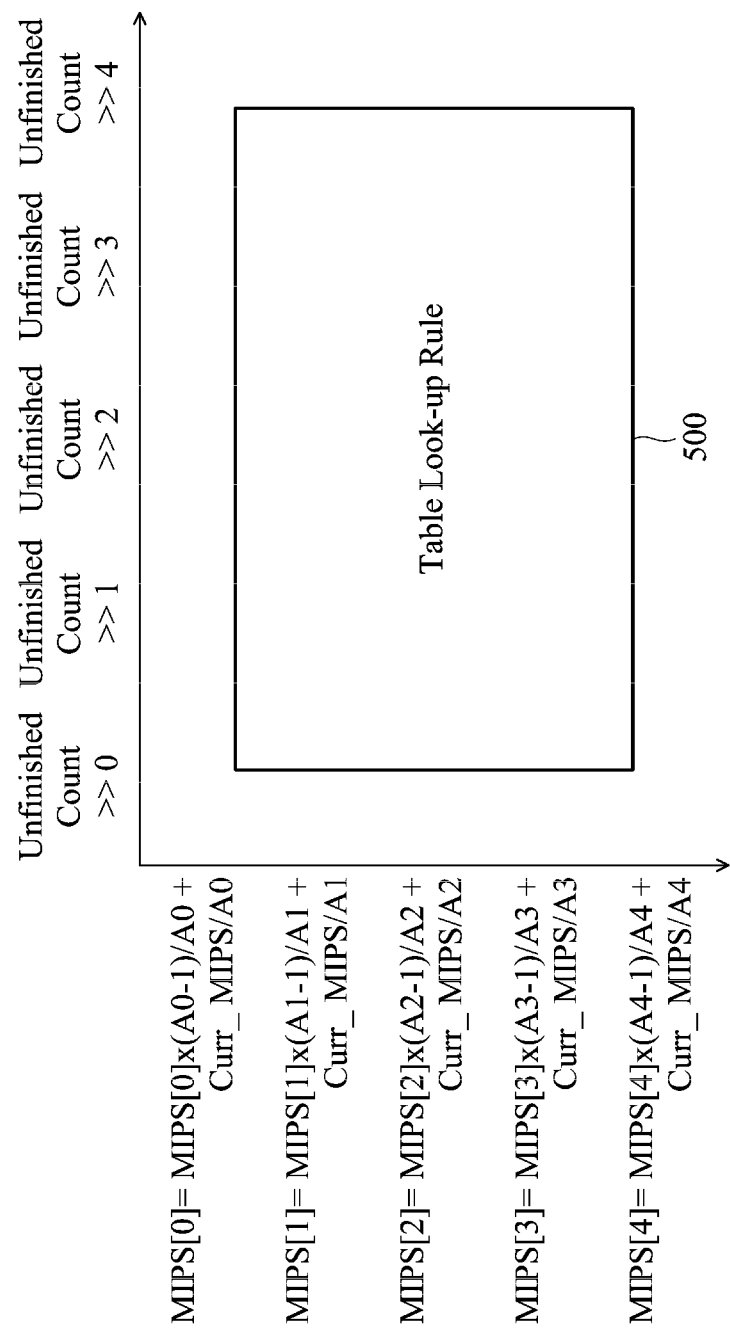
FIGS. 5A and 5B depict an algorithm for thread performance recognition (performed in block 326) based on the historic MIPS/clock cycle value information (214 of FIG. 2) and the currently-evaluated MIPS/clock cycle value (216 of FIG. 2)
Figure 5B:
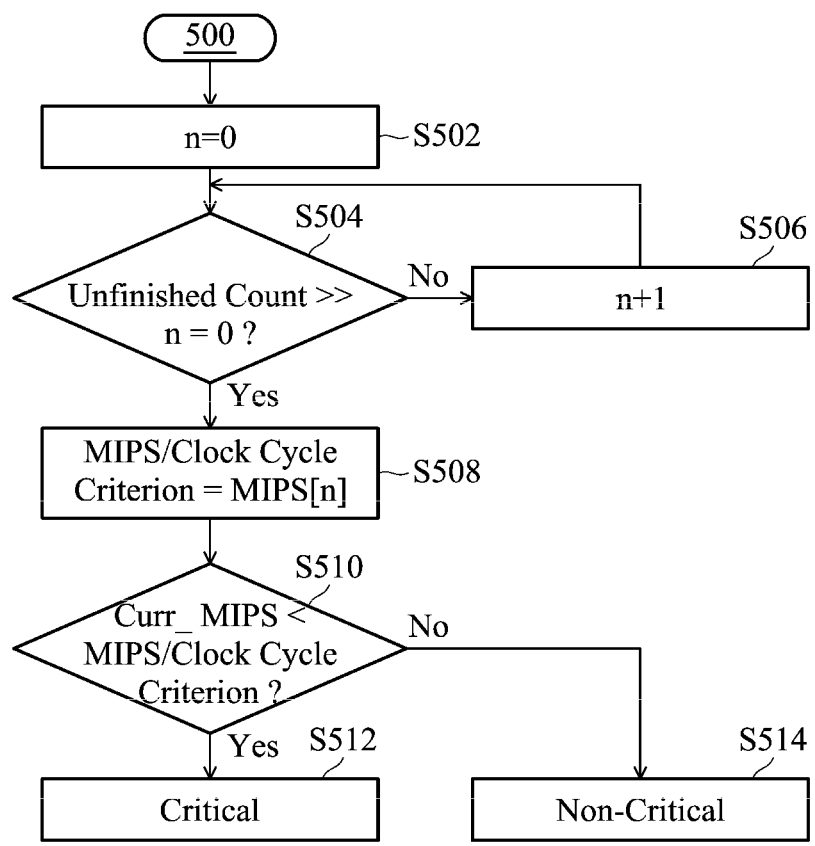

FIGS. 5A and 5B depict an algorithm for thread performance recognition (performed in block 326) based on the historic MIPS/clock cycle value information (214 of FIG. 2) and the currently-evaluated MIPS/clock cycle value (216 of FIG. 2). As shown in FIG. 5A, five values MIPS[0], the MIPS[1], the MIPS[2], the MIPS[3] and MIPS[4] are monitored and recorded in historic MIPS/clock cycle value information 214, where:

$$\text{MIPS}[0]=\text{MIPS}[0]\times(A0-1)/A0+\text{Curr\_MIPS}/A0;$$

$$\text{MIPS}[1]=\text{MIPS}[1]=(A1-1)/A1+\text{Curr\_MIPS}/A1;$$

$$\text{MIPS}[2]=\text{MIPS}[2]\times(A2-1)/A2+\text{Curr\_MIPS}/A2;$$

$$\text{MIPS}[3]=\text{MIPS}[3]\times(A3-1)/A3+\text{Curr\_MIPS}/A3; \text{ and}$$

$$\text{MIPS}[4]=\text{MIPS}[4]\times(A4-1)/A4+\text{Curr\_MIPS}/A4$$

Curr_MIPS is the currently-evaluated MIPS/clock cycle value, which is evaluated in block 326 and recorded in the field 216. As for the coefficients A0~A4, A0<A1<A2<A3<A4, e.g., A0=1, A1=2, A2=4, A3=8 and A4=16. Thus, as the index values increase, the historic MIPS/clock cycle values are more meaningful. The disclosed algorithm is performed in accordance with a table look-up rule 500, which is depicted in the flowchart of FIG. 5B.

Refer to the table look-up rule 500 depicted in FIG. 5B, the logical right shift (>>) amount n for an Unfinished Count is initialized to zero in step S502. In step S504, it is determined whether the Unfinished Count>>n is zero. When the Unfinished Count>>n is not zero, 1 is added to n in step S506. Once the Unfinished Count>>n equals zero, step S508 is performed and a MIPS/Clock Cycle Criterion is set to be MIPS[n]. In step S510, it is determined whether the currently-evaluated MIPS/clock cycle value Curr_MIPS is lower than the MIPS/Clock Cycle Criterion (MIPS[n]). When the currently-evaluated MIPS/clock cycle value Curr_MIPS is lower than the MIPS/Clock Cycle Criterion (MIPS[n]), step S512 is performed and the thread performance is determined to be critical and the critical flag 208 of FIG. 2 is asserted, accordingly. Otherwise, step S514 is performed and the thread performance is determined to be non-critical and the critical flag 208 of FIG. 2 is de-asserted.

For example, when the Unfinished Count is 4, with a right shifting operation, the first zero is obtained when right shifting the value 4 by 3 (4>>3=0). Thus, the MIPS[3] is picked out to be compared with the Curr_MIPS. When the Curr_MIPS is lower than the MIPS[3], it is determined that the performance of the thread is critical. Otherwise, it is determined that the performance of the thread is non-critical.

Note that the number of the criterion candidates is not limit to 5 (not limited to Latency[0]~Latency[4] or MIPS[0]~MIPS[4]), and, the coefficients A0 to A4 are not limited to $2^0$~$2^4$. These coefficients depend on the user requirements.

In other exemplary embodiments, considering computing capability, the unfinished count is omitted and the historic information is not taken into consideration. Thus, the thread performance recognition is based on the currently evaluated values.

In some exemplary embodiments, the waiting latency is not taken into consideration, wherein the thread performance recognition is based on the MIPS/clock cycle value. In some exemplary embodiments, the MIPS/clock cycle value is not taken into consideration, wherein the thread performance recognition is based on the waiting latency.

Figure 6:
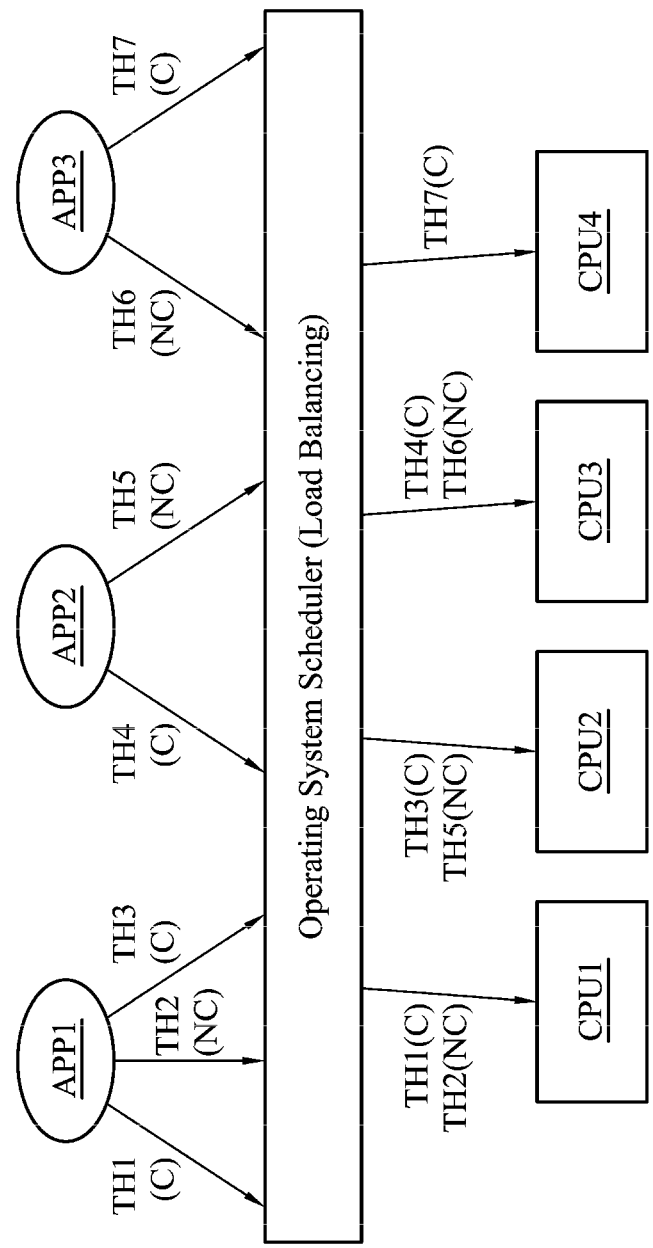
FIG. 6 illustrates thread load balancing between the different central processing units CPU1 to CPU4 of a multi-core processor.

The critical flags 208 of the different threads are utilized in the thread load balancing process of the operating system scheduler. FIG. 6 illustrates thread load balancing between the different central processing units CPU1 to CPU4 of a multi-core processor. As shown, three applications APP1, APP2 and APP3 are running on a multi-core device. The APP1 includes three threads TH1, TH2 and TH3, having critical flags "C", "NC" and "C", respectively. Hereinafter, "C" means that the thread is critical, and "NC" means that the thread performance is non-critical. The APP2 includes two threads TH4 and TH5, having critical flags "C" and "NC", respectively. The APP3 includes two threads TH6 and TH7, having critical flags "NC" and "C", respectively. According to the critical flags of the different threads TH1 to TH7, the thread load balancing process provided by an operating system scheduler dispatches the different threads TH1 to TH7 to the different central processing units CPU1 to CPU4 to balance the workload therebetween. As shown, the threads deemed as being critical TH1, TH3, TH4 and TH7 are separately dispatched to the different central processing units CPU1 to CPU4. In comparison with the conventional thread load balancing technique which only balances the thread amounts between the different central processing units without considering the thread critical performance condition of each thread, the thread load balancing technique of the disclosure dramatically improves the performance of the entire multi-core processor.

Further, a Dynamic Voltage and Frequency Scaling (DVFS) factor may be further considered in the thread load balancing process to scale the current processor frequency up to relieve a thread critical performance condition. Therefore, the number of critical tasks/threads across all CPUs may be timely reduced and thereby increase overall system performance.

Further, according to the thread performance recognition of the disclosure, a central processing unit in a power saving mode (e.g. sleep mode) may be woken up to perform a threads deemed as being critical. For example, when an extremely critical thread is detected (for example, a thread having a long waiting latency or a very low MIPS/clock cycle value,) a central processing unit in the sleep mode may be immediately woken up to cope with the critical thread.

In another exemplary embodiment, a multi-thread scheduling method for a multi-core device is disclosed, which comprises the following steps: evaluating thread performance for each thread; and dispatching the threads to multiple central processing units of a multi-core processor based on the evaluated thread performances. Note that performance-associated parameters are evaluated for each thread for thread performance evaluation and thread load balancing between the multiple central processing units.

The multi-thread scheduling method may be coded into the operating system codes as FIG. 1, to be executed by the multi-core processor. However, it is not intended to limit the multi-thread scheduling method to the computing architecture of FIG. 1. Any multi-thread management method based on the multi-thread scheduling method of the disclosure may be considered in reference to the multi-thread scheduling method of the disclosure.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-core device, comprising:
a multi-core processor, comprising multiple central processing units;
a random access memory, coupled to the multi-core processor,
wherein:
the multi-core processor uses the random access memory to store thread performance-associated parameters for a plurality of threads; and
a code storage, stored with operating system codes to be executed by the multi-core processor to provide an operating system scheduler to perform a thread load balancing between the multiple central processing units, performing the steps of:
thread load balancing according to a thread critical performance condition of the thread and the thread critical performance condition is determined based on the threads current and historical performance-associated parameters,
generating an array of entries for the performance-associated parameters, wherein each entry of the array corresponds to a historically observed values of the performance-associated parameter of the multi-core processor;
initializing an unfinished count of a thread to a value of zero;
determining a number of right shifts needed for making the value of the unfinished count to equal zero;
determining the historical observed value associated with the performance-associated parameter indexed at a position value equivalent to the number of right shifts;
determining if the current value of the performance-associated parameter associated with the thread is greater than the determined historic observed value, and if so setting the thread critical performance condition to critical;
if the current value of the performance-associated parameter associated with the thread is less than the determined historic observed value, performing the steps of:
preempting the thread;
increasing the unfinished count by one; and
repeating the determining steps; and
processing said thread on one of the multiple central processing units when the thread critical performance condition is critical.

2. The multi-core device as claimed in claim 1, wherein:
the thread performance-associated parameters comprises a waiting latency which indicates a waiting time of the thread in a runnable queue before switching to a running state, and the thread critical performance condition is evaluated based on the waiting latency of the thread.

3. The multi-core device as claimed in claim 2, wherein:
the thread performance-associated parameters further comprises historic waiting latency information, and to determine whether the thread critical performance condition is critical, a currently evaluated waiting latency of the thread is compared to a latency criterion, wherein the latency criterion is set based on the historic waiting latency information as well as the currently evaluated waiting latency, and
the criterion for the thread with the higher unfinished count comprises historic waiting latency information with a higher weight than that with a lower unfinished count.

4. The multi-core device as claimed in claim 1, wherein:
the thread performance-associated parameters comprises a MIPS/clock cycle value which indicates the execution speed of the thread in a running state, and the thread critical performance condition of the thread is evaluated based on the MIPS/clock cycle value of the thread.

5. The multi-core device as claimed in claim 4, wherein:
the thread performance-associated parameters further comprises historic MIPS/clock cycle value information, and to determine whether a thread critical performance condition is critical, a currently evaluated MIPS/clock cycle value of the thread is compared to a MIPS/clock cycle criterion, wherein the MIPS/clock cycle criterion is set based on the historic MIPS/clock cycle value information as well as the currently evaluated MIPS/clock cycle value, and
the criterion for the thread with the higher unfinished count comprises historic MIPS/clock cycle value information with a higher weight than that with a lower unfinished count.

6. The multi-core device as claimed in claim 1, wherein:
when the thread critical performance condition is critical, a central processing unit of the multiple central processing units wakes up from a power saving mode to execute the thread.

7. The multi-core device as claimed in claim 1, wherein:
when the thread critical performance condition is critical, a processor frequency of the central processing unit executing the thread is scaled up by Dynamic Voltage and Frequency Scaling.

8. The multi-core device as claimed in claim 1, wherein:
when the thread is released to a runnable state from a blocked state, the unfinished count is reset.

9. A multi-thread scheduling method for a multi-core device, comprising:
recording thread performance-associated parameters for a plurality of threads; and
performing a thread load balancing between multiple central processing units of a multi-core processor of the multi-core device,
wherein the thread load balancing is performed according to a thread critical performance condition of the thread and the thread critical performance condition is determined based on the thread performance-associated parameters,
generating an array of entries for the performance-associated parameters, wherein each entry of the array corresponds to a historically observed values of the performance-associated parameter of the multi-core processor;
initializing an unfinished count of a thread to a value of zero;
determining a number of right shifts needed for making the value of the unfinished count to equal zero;
determining the historical observed value associated with the performance-associated parameter indexed at a position value equivalent to the number of right shifts;
determining if the current value of the performance-associated parameter associated with the thread is greater than the determined historic observed value, and if so setting the thread critical performance condition to critical;
if the current value of the performance-associated parameter associated with the thread is less than the determined historic observed value, performing the steps of:
preempting the thread;
increasing the unfinished count by one; and
repeating the determining steps; and
processing said thread on one of the multiple central processing units when the thread critical performance condition is critical.

10. The multi-thread scheduling method as claimed in claim 9, wherein:
the thread performance-associated parameters comprises a waiting latency which indicates a waiting time of the thread in a runnable queue before switching to a running state, and the thread critical performance condition is evaluated based on the waiting latency of the thread.

11. The multi-thread scheduling method as claimed in claim 10, wherein:
the thread performance-associated parameters further comprises historic waiting latency information, and to determine whether the thread critical performance condition is critical, a currently evaluated waiting latency of the thread is compared to a latency criterion, wherein the latency criterion is set based on the historic waiting latency information as well as the currently evaluated waiting latency, and
the criterion for the thread with the higher unfinished count comprises historic waiting latency information with a higher weight than that with a lower unfinished count.

12. The multi-thread scheduling method as claimed in claim 9, wherein: the thread performance-associated parameters comprises a MIPS/clock cycle value which indicates the execution speed of the thread in a running state, and the thread critical performance condition of the thread is evaluated based on the MIPS/clock cycle value of the thread.

13. The multi-thread scheduling method as claimed in claim 12, wherein:
the thread performance-associated parameters further comprises historic MIPS/clock cycle value information, and to determine whether a thread critical performance condition is critical, a currently evaluated MIPS/clock cycle value of the thread is compared to a MIPS/clock cycle criterion, wherein the MIPS/clock cycle criterion is set based on the historic MIPS/clock cycle value information as well as the currently evaluated MIPS/clock cycle value, and
the criterion for the thread with the higher unfinished count comprises historic MIPS/clock cycle value information with a higher weight than that with a lower unfinished count.

14. The multi-thread scheduling method as claimed in claim 9, wherein: when the thread critical performance condition is critical, a central processing unit of the multiple central processing units wakes up from a power saving mode to execute the thread.

15. The multi-thread scheduling method as claimed in claim 9, wherein: when the thread critical performance condition is critical, a processor frequency of the central processing unit executing the thread is scaled up by Dynamic Voltage and Frequency Scaling.

16. The multi-thread scheduling method as claimed in claim 9, wherein:
when the thread is released to a runnable state from a blocked state, the unfinished count is reset.

* * * * *